(12) United States Patent
Fan

(10) Patent No.: US 8,856,772 B2
(45) Date of Patent: Oct. 7, 2014

(54) SERVER AND FIRMWARE UPDATING METHOD

(75) Inventor: Cun-Hui Fan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 61 days.

(21) Appl. No.: 13/472,416

(22) Filed: May 15, 2012

(65) Prior Publication Data

US 2013/0007430 A1    Jan. 3, 2013

(30) Foreign Application Priority Data

Jun. 30, 2011   (CN) .......................... 2011 1 0182199

(51) Int. Cl.
*G06F 9/24* (2006.01)
*G06F 9/312* (2006.01)
*G06F 9/445* (2006.01)

(52) U.S. Cl.
CPC ...................................... *G06F 9/445* (2013.01)
USPC ................................ 717/168; 714/15; 713/1

(58) Field of Classification Search
None
See application file for complete search history.

(56) References Cited

U.S. PATENT DOCUMENTS

| 8,417,774 B2* | 4/2013 | Flynn et al. .................... 709/204 |
| 2009/0025008 A1* | 1/2009 | Hung ............................ 719/312 |
| 2012/0110379 A1* | 5/2012 | Shao et al. ....................... 714/15 |
| 2012/0303940 A1* | 11/2012 | Grice et al. ....................... 713/1 |

* cited by examiner

*Primary Examiner* — Chat Do
*Assistant Examiner* — Louis A Angelucci
(74) *Attorney, Agent, or Firm* — Novak Druce Connolly Bove + Quigg LLP

(57) ABSTRACT

A server includes a Southbridge chipset, a USB port, a storage device, a baseboard management controller (BMC), and a switch. When the BMC is powered on and started, the BMC establishes communication between a USB device connected to the server and the BMC by uploading a driver of the USB device from the storage device to memory of the BMC. In response to receiving a firmware update command in relation to the BMC, the BMC disconnects an electrical connection between the USB port and the Southbridge chipset, and establishes an electrical connection between the USB port and the BMC using the switch. Then, the BMC reads updated firmware data from the USB device via the USB port, writes the updated firmware data into the memory, and updates the firmware of the BMC by writing the updated firmware data into the storage device.

9 Claims, 3 Drawing Sheets

SERVER AND FIRMWARE UPDATING METHOD

BACKGROUND

1. Technical Field

Embodiments of the present disclosure relates to data updating technology, and more particularly, to a server and a firmware data updating method.

2. Description of Related Art

At present, updating firmware of a baseboard management controller (BMC) is often performed under an operating system of a server in which the BMC is located. New data is written into the BMC using special software update tools. However, the aforementioned update manner depends on the operating system of the server, which requires the server to be in a booted state.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or software, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
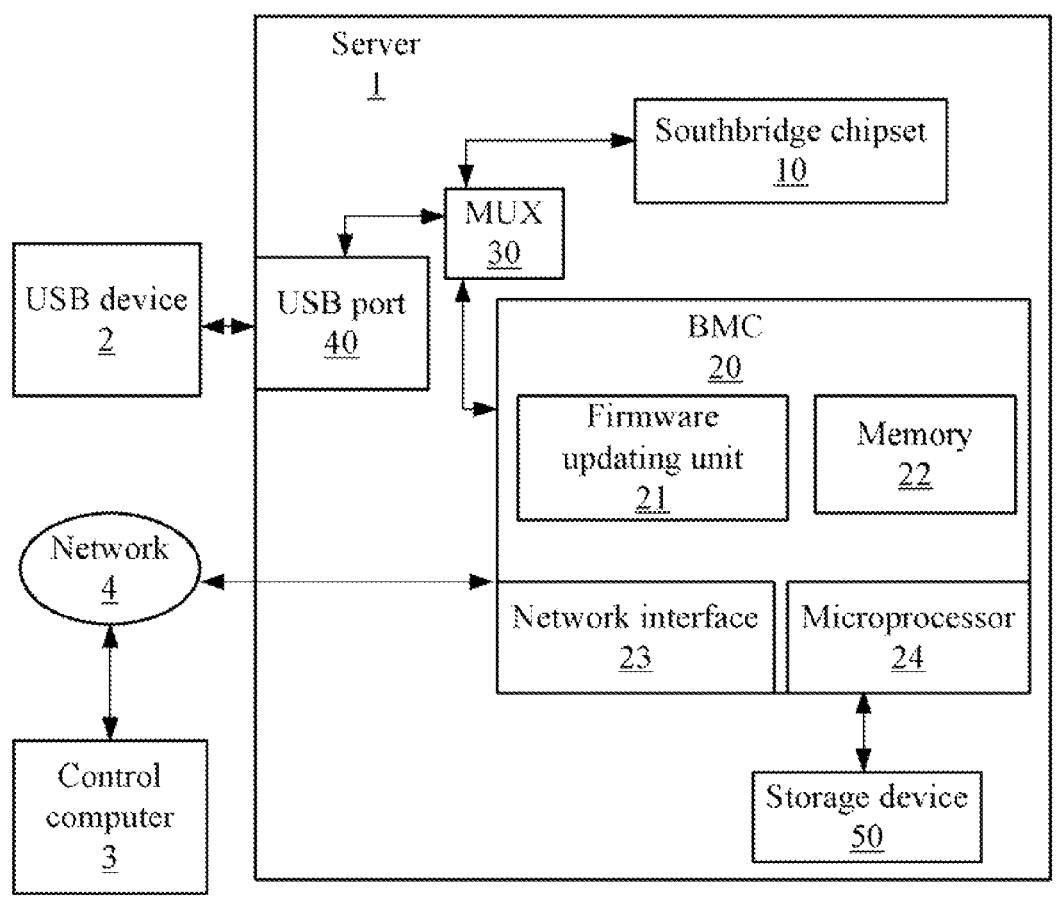
FIG. 1 is a block diagram of one embodiment of a server for updating firmware of a BMC.

FIG. 1 is a block diagram of one embodiment of a server 1. The server 1 includes a Southbridge chipset 10, a baseboard management controller (BMC) 20 and a USB port 40 connected to the Southbridge chipset 10 via a switch, such as a multiplexer (MUX) 30, and a storage device 50 connected to the BMC 20. The components 10, 20, 30, 40, 50 communicate over one or more communication buses or signal lines. It should be appreciated that the server 1 may have more or fewer components than shown in FIG. 1, or have a different configuration of components. A USB device 2 is connected to the USB port 40. In a default mode, the USB port 40 is available to the Southbridge chipset 10; however, in this embodiment, the USB port 40 may be available either to the Southbridge chipset 10 or to the BMC 20 under the control of the MUX 30.

As shown in FIG. 1, the BMC 20 includes a firmware updating unit 21, a network interface 22, a memory 23, and a microprocessor 24. The BMC 20 has a network card (not shown) and an allocated IP address, and communicates with a control computer 3 via a network 4 depending on the network card and the IP address. Depending on the embodiment, the BMC 20 may be remotely started via the network 4, such as using secure shell (SSH), intelligent platform management interface (IPMI), or Telnet. In such a situation, the server 1 is in a power-on state but does not require to be in a booted state. The BMC 20 may be supplied with power via the server 1, or be supplied via an independent power source.

The storage device 50 stores firmware data in relation to the BMC 20 and a driver of the USB device. When the USB port 40 is available to the BMC 20, the firmware updating unit 21 runs the driver to read data for updating firmware of the BMC 20 (hereinafter, "updated firmware data") from the USB device 2 via the USB port 40, and replaces the firmware data in relation to the BMC 20 stored in the storage device 50 with the updated firmware data. In this embodiment, the storage device 50 is a non-transitory medium, such as a flash memory.

Figure 2:
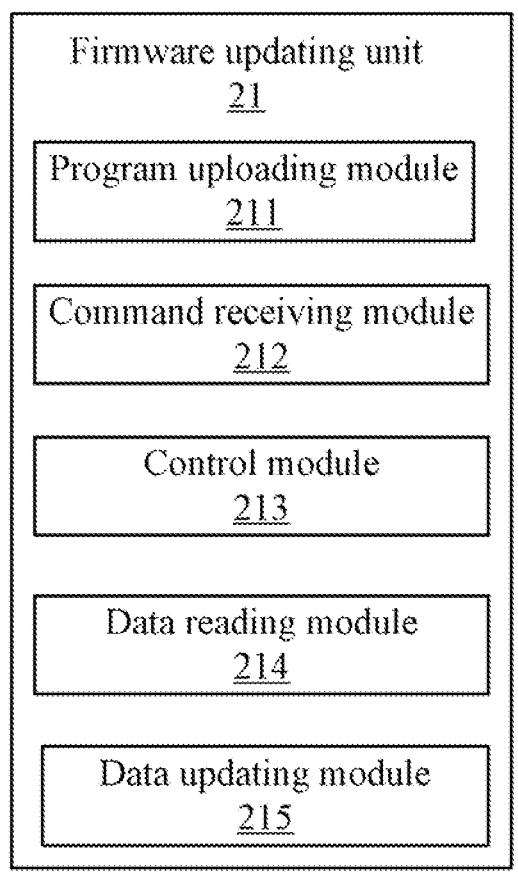
FIG. 2 is a block diagram of one embodiment of function modules of a firmware updating unit in the server of FIG. 1.

As shown in FIG. 2, the firmware updating unit 21 includes a program uploading module 211, a command receiving module 212, a control module 213, a data reading module 214, and a data uploading module 215. The modules 211-215 may comprise computerized code in the form of one or more programs (computer-readable program code) that are stored in the storage device 50. The computerized code includes instructions that are executed by the microprocessor 24 to provide the functions of the modules 211-215 illustrated in FIG. 3.

Figure 3:
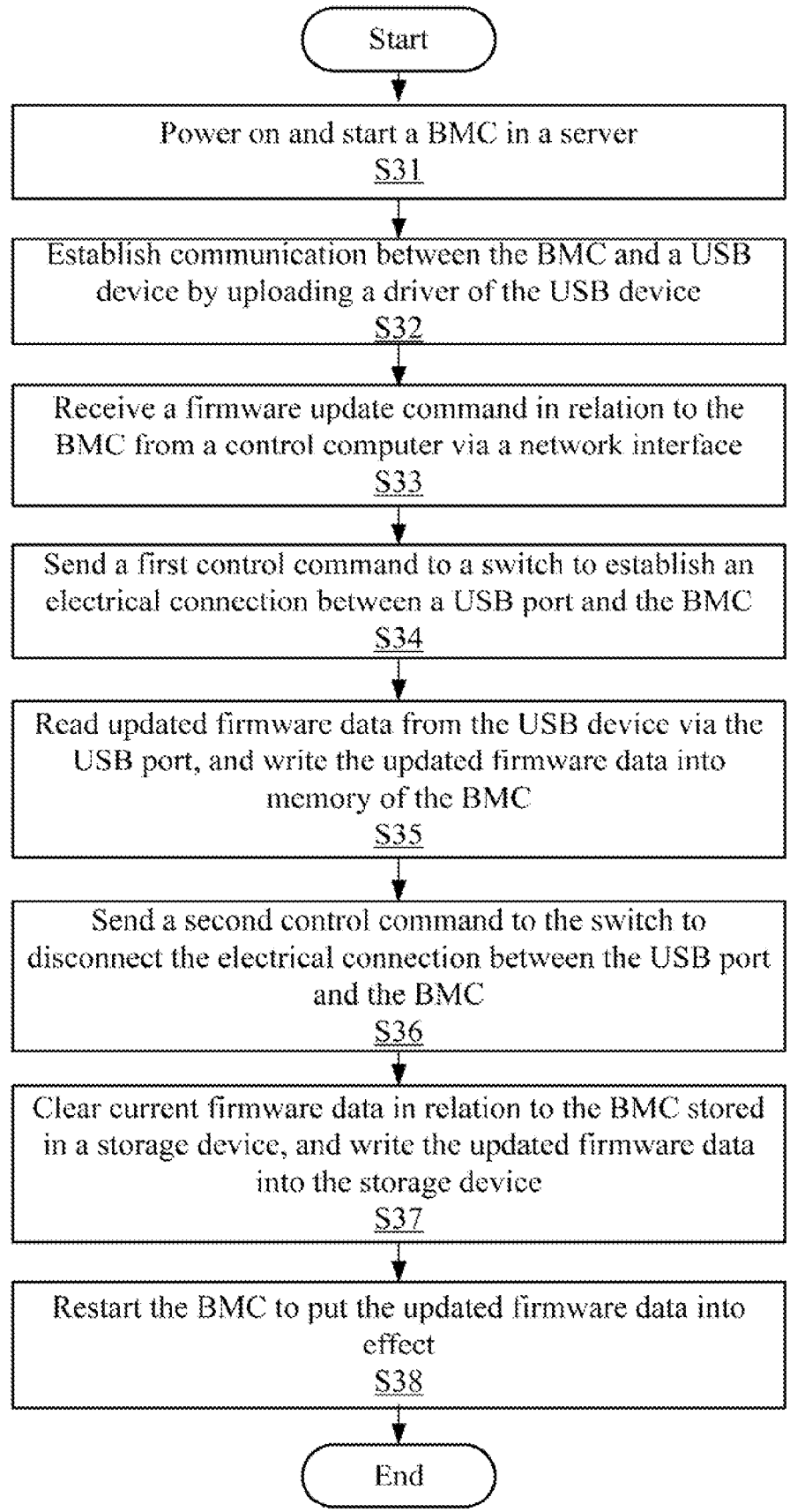
FIG. 3 is a flowchart of one embodiment of a firmware updating method.

FIG. 3 is a flowchart of one embodiment of a firmware updating method. Depending on the embodiment, additional steps may be added, others removed, and the ordering of the steps may be changed.

In step S31, the BMC 20 is powered on and started. As mentioned above, the BMC 20 may be supplied with power via a power supply of the server 1, or be supplied via an independent power source. The BMC 20 may be started by starting the server 1, or be remotely started via the network 4 without booting the server 1, such as using secure shell (SSH), intelligent platform management interface (IPMI), or Telnet.

In step S32, the program uploading module 211 uploads a driver of the USB device 2 from the storage device 50, and runs the driver to establish an electrical connection between the BMC 20 and the USB device 2.

In step S33, the command receiving module 212 receives a update command for updating firmware of the BMC 20 from the control computer via the network 4 and the network interface 23.

In step S34, the control module 213 controls the MUX 30 to disconnect an electrical connection between the USB port 40 and the Southbridge chipset 10, and establish an electrical connection between the USB port 40 and the BMC 20, by sending a first control command to the MUX 30, so that the USB port 40 becomes available to the BMC 20. As mentioned above, in a default mode, the USB port 40 is only available to the Southbridge chipset 10.

In step S35, the data reading module 214 reads updated firmware data in relation to the BMC 20 from the USB device 2 via the USB port 40, and writes the update firmware data into the memory 23.

In step S36, the control module 213 controls the MUX 30 to disconnect the electrical connection between the USB port 40 and the BMC 20, and reestablish the electrical connection between the USB port 40 and the Southbridge chipset 10, by sending a second control command to the MUX 30.

In step S37, the data updating module 215 updates firmware of the BMC 20 by clearing current firmware data stored within the storage device 50 and writing the updated firmware data into the storage device 50.

In step S38, the control module 213 restarts the BMC 30 to put the updated firmware data into effect.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a microprocessor of a baseboard management controller (BMC) located in a server, the server comprising a southbridge chipset, a usb port, a storage device, a network controller, a hardware control module and a switch controlling an electrical connection between the usb port and the BMC and an electrical connection between the usb port and the Southbridge chipset, the method comprising:

the electrical switch controlling the electrical connection between the universal serial bus port, the Southbridge chipset and the BMC having the default state connecting the universal serial bus port to the southbridge chipset electrically;

uploading a driver of a universal serial bus device from the storage device to a memory of the BMC and the BMC being remotely started via a network, using secure shell, without booting the server;

disconnecting the electrical connection between the universal serial bus port and the Southbridge chipset when a firmware update command in relation to the BMC is received, and establishing the electrical connection between the universal serial bus port and the BMC by sending a first control command to the switch; the first control command sent from the hardware control module;

reading updated firmware data from the universal serial bus device via the universal serial bus port, and writing the updated firmware data into the memory; and the updating module, updates firmware of the BMC by clearing current firmware data stored within the storage device and writing the updated firmware data into the storage device;

disconnection the electrical connection between the universal serial bus port and the BMC, and reestablishing the electrical connection between the universal serial bus port and the Southbridge chipset by sending a second control command to the switch, the second control command sent from the hardware control module.

2. The method of claim 1, further comprising:
restarting the BMC to put the updated firmware data into effect.

3. The method of claim 1, wherein the BMC is supplied with power by a power supply of the server or an independent power source.

4. A server, comprising:
a Southbridge chipset;
a universal serial bus port;
a storage device;
a baseboard management controller (BMC);
a network controller;
a hardware control module;
a switch controlling an electrical connection between the universal serial bus port and the southbridge chipset and an electrical connection between the universal serial bus port and the BMC;
one or more programs that are stored in the storage device and executed by a microprocessor of the BMC, the one or more programs comprising instructions to:

the electrical switch controlling the electrical connection between the universal serial bus port, the Southbridge chipset and the BMC having the default state connecting the universal serial bus port to the Southbridge chipset electrically;

establish communication between a universal serial bus device connected to the server and the BMC by uploading a driver of the universal serial bus device from the storage device to a memory of the BMC and the BMC being remotely started via a network, by using secure shell, without booting the server;

disconnect the electrical connection between the universal serial bus port and the southbridge chipset when a firmware update command in relation to the BMC is received, and establish the electrical connection between the universal serial bus port and the BMC by sending a first control command to the switch, wherein the first control command is sent from the hardware control module;

read updated firmware data from the universal serial bus device via the universal serial bus port, and write the updated firmware data into the memory; and updating firmware of the BMC by clearing current firmware data stored within the storage device and writing the updated firmware data into the storage device; and disconnection the electrical connection between the universal serial bus port and the BMC, and reestablishing the electrical connection between the universal serial bus port and the southbridge chipset by sending a second control command to the switch, wherein the second control command is sent from the hardware control module.

5. The method of claim 4, wherein the one or more programs further
comprise instructions to:
restart the BMC to put the updated firmware data into effect.

6. The server of claim 4, wherein the BMC is supplied with power by a power supply of the server or an independent power source.

7. A non-transitory storage medium storing a set of instructions, the set of instructions capable of being executed by a microprocessor of a baseboard management controller (BMC) located in a server for performing a method for updating firmware data of the BMC, the server further comprising a Southbridge chipset, a universal serial bus port, a storage device, a network controller, a hardware control module and a switch controlling an electrical connection between the universal serial bus port and the BMC and an electrical connection between the universal serial bus port and the Southbridge chipset, the method comprising:

the electrical switch controlling the electrical connection between the universal serial bus port, the Southbridge chipset and the BMC having the default state connecting the universal serial bus port to the Southbridge chipset electrically;

establishing communication between a universal serial bus device connected to the server and the BMC by uploading a driver of the universal serial bus device from the storage device to a memory of the BMC and the BMC being remotely started via a network, by using secure shell, without booting the server;

disconnecting the electrical connection between the universal serial bus port and the Southbridge chipset when a firmware update command in relation to the BMC is received, and establishing the electrical connection between the universal serial bus port and the BMC by sending a first control command to the switch, wherein the first control command is sent from the hardware control module;

reading updated firmware data from the universal serial bus device via the universal serial bus port, and writing the updated firmware data into the memory; and updating firmware of the BMC by clearing current firmware data stored within the storage device and writing the updated firmware data into the storage device; and disconnection the electrical connection between the universal serial bus port and the BMC, and reestablishing the electrical connection between the universal serial bus port and the southbridge chipset by sending a second control command to the switch, wherein the second control command is sent from the hardware control module.

8. The medium of claim 7, wherein the method further comprises:

restarting the BMC to put the updated firmware data into effect.

9. The medium of claim 7, wherein the BMC is supplied with power by a power supply of the server or an independent power source.

\* \* \* \* \*